(12) United States Patent
Hasegawa et al.

(10) Patent No.: US 7,710,889 B2
(45) Date of Patent: May 4, 2010

(54) COMMUNICATION SYSTEM, DELAY INSERTION SERVER, BACKUP SERVER AND COMMUNICATION CONTROL APPARATUS

(75) Inventors: Teruyuki Hasegawa, Fujimino (JP); Toru Hasegawa, Fujimino (JP)

(73) Assignee: KDDI Corporation, Tokyo (JP)

( * ) Notice: Subject to any disclaimer, the term of this patent is extended or adjusted under 35 U.S.C. 154(b) by 988 days.

(21) Appl. No.: 11/291,339

(22) Filed: Nov. 30, 2005

(65) Prior Publication Data
US 2006/0120396 A1 Jun. 8, 2006

(30) Foreign Application Priority Data
Dec. 2, 2004 (JP) .............................. 2004-349665

(51) Int. Cl.
| | |
|---|---|
| G01R 31/08 | (2006.01) |
| G01F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04J 3/26 | (2006.01) |
| G06F 15/173 | (2006.01) |
| G06F 11/00 | (2006.01) |
| H04L 12/28 | (2006.01) |
| H04L 12/56 | (2006.01) |

(52) U.S. Cl. .................... 370/250; 370/390; 370/432; 709/240; 714/2

(58) Field of Classification Search ......... 370/216–221, 370/226–228, 241, 242, 244, 245, 250, 390, 370/432, 394, 395.21, 395.4; 709/240, 241
See application file for complete search history.

(56) References Cited

U.S. PATENT DOCUMENTS 6,269,080 B1 * 7/2001 Kumar ....................... 370/236

(Continued)

FOREIGN PATENT DOCUMENTS

JP 2005-252670 9/2005

OTHER PUBLICATIONS

Beau Williamson; "*IP Multicast Network Development Guide*"; vol. 1; Softbank Publishing Corp.; Jul. 3, 2001.

(Continued)

*Primary Examiner*—Seema S Rao
*Assistant Examiner*—Xavier Szewai Wong
(74) *Attorney, Agent, or Firm*—Edwards Angell Palmer & Dodge LLP; David G. Conlin; David A. Tucker

(57) ABSTRACT

A communication system includes a probe transmission server 3 which transmits at fixed intervals of time a probe multicast packet distributed along the same path as a main multicast packet, a delay insertion server 5 which appends the same fixed delay time to each of the main multicast packet and the probe multicast packet, a backup server 2 which generates synchronism and delay backup multicast packets from the main multicast packet and transmits them, and a communication control device 7 which determines the communication of the main multicast packet based on a reception interval of the probe multicast packet, generates a backup main multicast packet from the backup multicast packet when a communication break is detected, and transmits it. The communication system, upon implementing a broadcast-type multicast service, enhances compensation of communication breaks when detecting and recovering from a fault in an IP network, and reduces the network traffic.

7 Claims, 6 Drawing Sheets

U.S. PATENT DOCUMENTS

| | | | |
|---|---|---|---|
| 6,363,056 B1 * | 3/2002 | Beigi et al. | 370/252 |
| 6,430,153 B1 * | 8/2002 | Hughes et al. | 370/230.1 |
| 6,512,776 B1 * | 1/2003 | Jones et al. | 370/432 |
| 6,985,454 B1 * | 1/2006 | Wiedeman et al. | 370/316 |
| 7,142,518 B2 * | 11/2006 | Mitchell | 370/290 |
| 7,260,066 B2 * | 8/2007 | Wang et al. | 370/248 |
| 7,599,368 B2 * | 10/2009 | Hasegawa et al. | 370/390 |
| 2002/0001310 A1 * | 1/2002 | Mai et al. | 370/390 |
| 2002/0126685 A1 * | 9/2002 | Leatherbury et al. | 370/432 |
| 2003/0142670 A1 * | 7/2003 | Gould et al. | 370/390 |
| 2003/0198363 A1 * | 10/2003 | Liao et al. | 382/100 |
| 2003/0223422 A1 * | 12/2003 | Igarashi et al. | 370/390 |
| 2004/0215799 A1 * | 10/2004 | Lehmann et al. | 709/230 |
| 2005/0135248 A1 * | 6/2005 | Ahuja et al. | 370/235 |
| 2005/0198363 A1 * | 9/2005 | Ling et al. | 709/236 |
| 2006/0056403 A1 * | 3/2006 | Pleasant et al. | 370/389 |

OTHER PUBLICATIONS

M. Handley et al.; "*The Reliable Multicast Design Space for Bulk Transfer*"; The Internet Society; 2000.

Teruyuki Hasegawa, Tow Hasegawa et al., "A Multicast Gateway for Non-Stop One-to-Many Multicast Communications", The 2004 IEICE Communications Society Conference, B-6-98, Sep. 8, 2004.

Teruyuki Hasegawa, Toru Hasegawa et al., "A Study on High Availability One-to-Many Multicast Communications", The 2004 IEICE General Conference, B-6-14, Mar. 8, 2004.

* cited by examiner

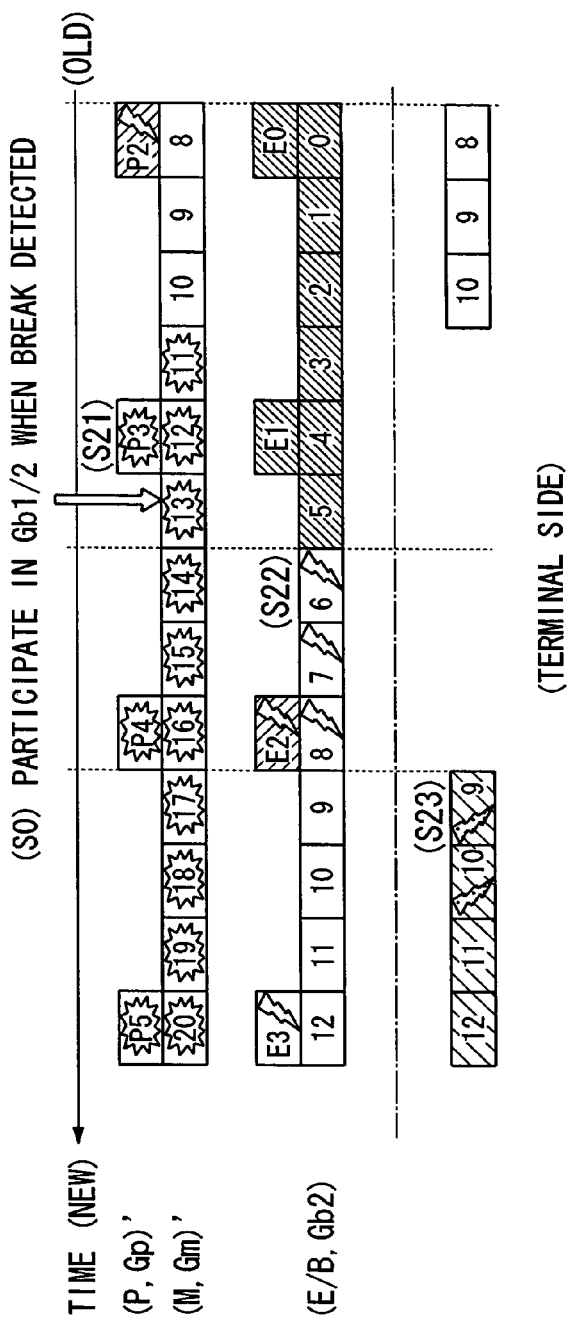

COMMUNICATION SYSTEM, DELAY INSERTION SERVER, BACKUP SERVER AND COMMUNICATION CONTROL APPARATUS

BACKGROUND OF THE INVENTION

1. Field of the Invention

The present invention relates to a communication system which distributes a continuous stream packet from at least one server to multiple clients via an IP network, a delay insertion server, a backup server, and a communication control apparatus.

Priority is claimed on Japanese Patent Application No. 2004-349665, filed Dec. 2, 2004, the content of which is incorporated herein by reference.

2. Description of Related Art

To implement a service such as video distribution, a multicast is defined in an open systems interconnection (OSI) Layer-3 internet protocol (IP), and various types of protocol corresponding thereto are mounted and executed (e.g. see Non-Patent Literature 1: Beau Williamson, "IP Multicast Network Development Guide Vol. 1" Softbank Publishing Corp., Jul. 3, 2001.). Various types of highly reliable multicast communication protocols for supporting a multicast without losing data have been proposed (e.g. see Non-Patent Literature 2: M. Handley et al, "The Reliable Multicast Design Space for Bulk Transfer" The Internet Society, 2000).

One general example of a packet loss compensation system in a multicast distribution network currently in active use is a forward error correction (FEC)-based system, disclosed in the Non-Patent Literature 2. In this method, error correction information relating to one or a number of packets is transmitted simultaneously with the relay data, or multiplexed as appropriate, and errors are corrected on the receiving side. The Non-Patent Literature 2 also discloses various systems based on data retransmission in accordance with an acknowledgement (ACK) or a negative-acknowledgement (NACK) from the receiving side.

However, even if a high-reliability IP network is constructed using a router (L3 {Layer-3}) with a redundant configuration, a time of approximately several seconds to several tens of seconds is required for conventional multicast path control protocols due to dynamic changes in the multicast distribution path which accompany L3 switch/link disorders and the like. All data distributed during this period is lost.

In the FEC-based packet loss compensation system, a fixed rate of redundant data must be relayed irrespective of whether or not there are packet losses. This makes it impossible to compensate a large amount of continuous packet loss of the type mentioned above. Moreover, retransmission-based systems require the addition of an ACK/NACK reply function on the terminal side, and the addition of a retransmission function in the router and the transmission terminal. Protocols which guarantee the arrival of all packets are problematic in that they do not guarantee the arrival times.

In view of the above problems, the present inventors have disclosed in Japanese Patent Application No. 2004-060528 a technique, used when implementing a broadcast-type multicast communication service using an IP network having a redundant configuration, for compensating communication breaks caused when disorders in the IP network are detected and repaired. There is also a demand to reduce the traffic on the network by enhancing compensation of these communication breaks.

SUMMARY OF THE INVENTION

A first aspect of the present invention is a communication system which uses an IP network to support broadcast-type multicast packet communications, including: a distribution server which transmits a main multicast packet distributed in a broadcast format; a probe transmission server which transmits at fixed intervals of time a probe multicast packet distributed via the same path as the main multicast packet; a delay insertion server which receives the main multicast packet and the probe multicast packet, inserts same fixed delay time to both of the received multicast packets, and transmits both of the received multicast packets to the IP network; a backup server which receives the main multicast packet, generates two copied multicast packets by copying the received main multicast packet, and transmits one of the copied multicast packets as a synchronism backup multicast packet to the IP network, and in addition, inserts a fixed delay time to rest of the copied multicast packets and transmits as a delay backup multicast packet to the IP network; and a communication control apparatus which, when a communication break in the main multicast packet is detected, receives both the backup multicast packets from the IP network, uses the received backup multicast packets to generate a backup main multicast packet which is distributed via the same path as the main multicast packet, and transmits the backup main multicast packet to the IP network; the communication control apparatus receiving the probe multicast packet from the IP network and checking a communication condition of the main multicast packet based on a reception interval of the probe multicast packet.

A second aspect of the present invention is the above described communication system, wherein the delay time inserted by the delay insertion server corresponds to processing time which is required by the backup server from receiving the main multicast packet to transmitting the synchronism backup multicast packet.

A third aspect of the present invention is the above described communication system, wherein the communication control apparatus includes: a transmission queue which stores the synchronism backup multicast packet which is received; a match detection unit which detects reception of the delay backup multicast packet which matches the received synchronism backup multicast packet; and a transmission control unit which, when a communication break in the multicast packet is detected, transmits the received delay backup multicast packet as the backup main multicast packet, and, when a match is subsequently detected, extracts the synchronism backup multicast packet from the transmission queue and transmits as the backup main multicast packet, and stops reception of the delay backup multicast packet.

A fourth aspect of the present invention is the above described communication system, wherein the match detection unit compares UDP checksums respectively contained in the received synchronism backup multicast packet and the delay backup multicast packet.

A fifth aspect of the present invention is the above described communication system, wherein the probe transmission server appends transmission sequence identification information which enables a transmission sequence to be identified to the probe multicast packet; the backup server receives the probe multicast packet, generates two copied probe multicast packets by copying the received probe multicast packet, and transmits one of the copied probe multicast packet as a synchronism backup probe multicast packet to the IP network, and in addition, inserts a fixed delay time to rest of the copied probe multicast packet and transmits as a delay backup probe multicast packet to the IP network; and the communication control apparatus determines whether or not the synchronism backup multicast packet matches the delay backup multicast packet based on the transmission sequence identification information contained in both the received backup probe multicast packets.

A sixth aspect of the present invention is the above described communication system, wherein every time the synchronism backup multicast packet is received from the IP network, the transmission control unit extracts multiple synchronism backup multicast packets of a fixed number from the transmission queue and transmits as the backup main multicast packet.

A seventh aspect of the present invention is the above described communication system, wherein the probe transmission server appends transmission sequence identification information which enables a transmission sequence to be identified to the probe multicast packet; the backup server receives the probe multicast packet, copies the received probe multicast packet, inserts the same delay time as that of the delay backup multicast packet to the copied probe multicast packet and transmits as a delay backup probe multicast packet to the IP network; and the communication control apparatus receives the delay backup probe multicast packet from the IP network; the transmission control unit determines, based on the transmission sequence identification information which is respectively appended to the received probe multicast packet and the delay backup probe multicast packet, distribution status at the time of a communication break in the main multicast packet, and, after detection of the communication break in the main multicast packet, controls transmission of the backup main multicast packet by using the delay backup multicast packet.

An eighth aspect of the present invention is a delay insertion server which is included in a communication system which uses an IP network to support broadcast-type multicast packet communications, including: a first unit which receives a main multicast packet distributed in a broadcast format and a probe multicast packet distributed along a same path as the main multicast packet; and a second unit which inserts same fixed delay time to both the received multicast packets and transmits to the IP network.

A ninth aspect of the present invention is a backup server which is included in a communication system which uses an IP network to support broadcast-type multicast packet communications, including: a first unit which receives a main multicast packet distributed in a broadcast format; a second unit which generates two copied packets based on the received main multicast packet; a third unit which transmits one of the copied packets as a synchronism backup multicast packet to the IP network; and a fourth unit which inserts a fixed delay time to rest of the copied packets and transmits as a delay backup multicast packet to the IP network.

A tenth aspect of the present invention is the above described backup server, further including: a fifth unit which receives a probe multicast packet which is distributed via a same path as the main multicast packet; a sixth unit which copies the received probe multicast packet; and a unit which inserts the same delay time as that of the delay backup multicast packet to the copied probe multicast packet and transmits as a delay backup probe multicast packet to the IP network.

An eleventh aspect of the present invention is the above described backup server, further including a seventh unit which transmits the copied probe multicast packet as a synchronism backup probe multicast packet to the IP network.

A twelfth aspect of the present invention is a communication control apparatus which is included in a communication system which uses an IP network to support broadcast-type multicast packet communications, including: a first unit which receives a probe multicast packet which same fixed delay time as that of a main multicast packet is inserted to, and which is distributed via a same path as the main multicast packet which is distributed in a broadcast format, from the IP network; a second unit which checks communication condition of the main multicast packet based a reception interval of the probe multicast packet; a third unit which, when a communication break in the main multicast packet is detected, receives a synchronism backup multicast packet which is copied from the main multicast packet and a delay backup multicast packet which is copied from the main multicast packet and which is generated by inserting a same fixed delay time to the copied packet; and a fourth unit which uses the received backup multicast packets to generate a backup main multicast packet which is distributed via the same path as the main multicast packet, and transmits the backup main multicast packet to the IP network.

A thirteenth aspect of the present invention is the above described communication control apparatus, further including a transmission queue which stores the received synchronism backup multicast packet; a match detection unit which detects reception of a delay backup multicast packet which matches the received synchronism backup multicast packet; and a transmission control unit which, when a communication break in the multicast packet is detected, transmits the received delay backup multicast packet as the backup main multicast packet, and, when a match is subsequently detected, extracts the synchronism backup multicast packet from the transmission queue and transmits it as the backup main multicast packet, and stops reception of the delay backup multicast packet.

A fourteenth aspect of the present invention is the above described communication control apparatus, wherein every time the synchronism backup multicast packet is received from the IP network, the transmission control unit extracts multiple synchronism backup multicast packets of a fixed number from the transmission queue and transmits as the backup main multicast packet.

A fifteenth aspect of the present invention is the above described communication control apparatus, further including a unit which receives a delay backup probe multicast packet, which is generated by inserting a same delay time as that of the delay backup multicast packet to copy of the probe multicast packet, from the IP network; wherein the probe multicast packet includes transmission sequence identification information for identification of the transmission sequence; the transmission control unit determining, based on the transmission sequence identification information respectively appended to the received probe multicast packet and the delay backup probe multicast packet, the distribution status at the time of a communication break in the main multicast packet, and, after detection of the communication break in the main multicast packet, controlling transmission of the backup main multicast packet by using the delay backup multicast packet.

BRIEF DESCRIPTION OF THE DRAWINGS

FIG. 6 is a schematic diagram for explanation of distribution processing when a fault has occurred, according to the embodiment of this invention.

DETAILED DESCRIPTION OF THE INVENTION

An embodiment of this invention will be explained with reference to the diagrams.

Figure 1:
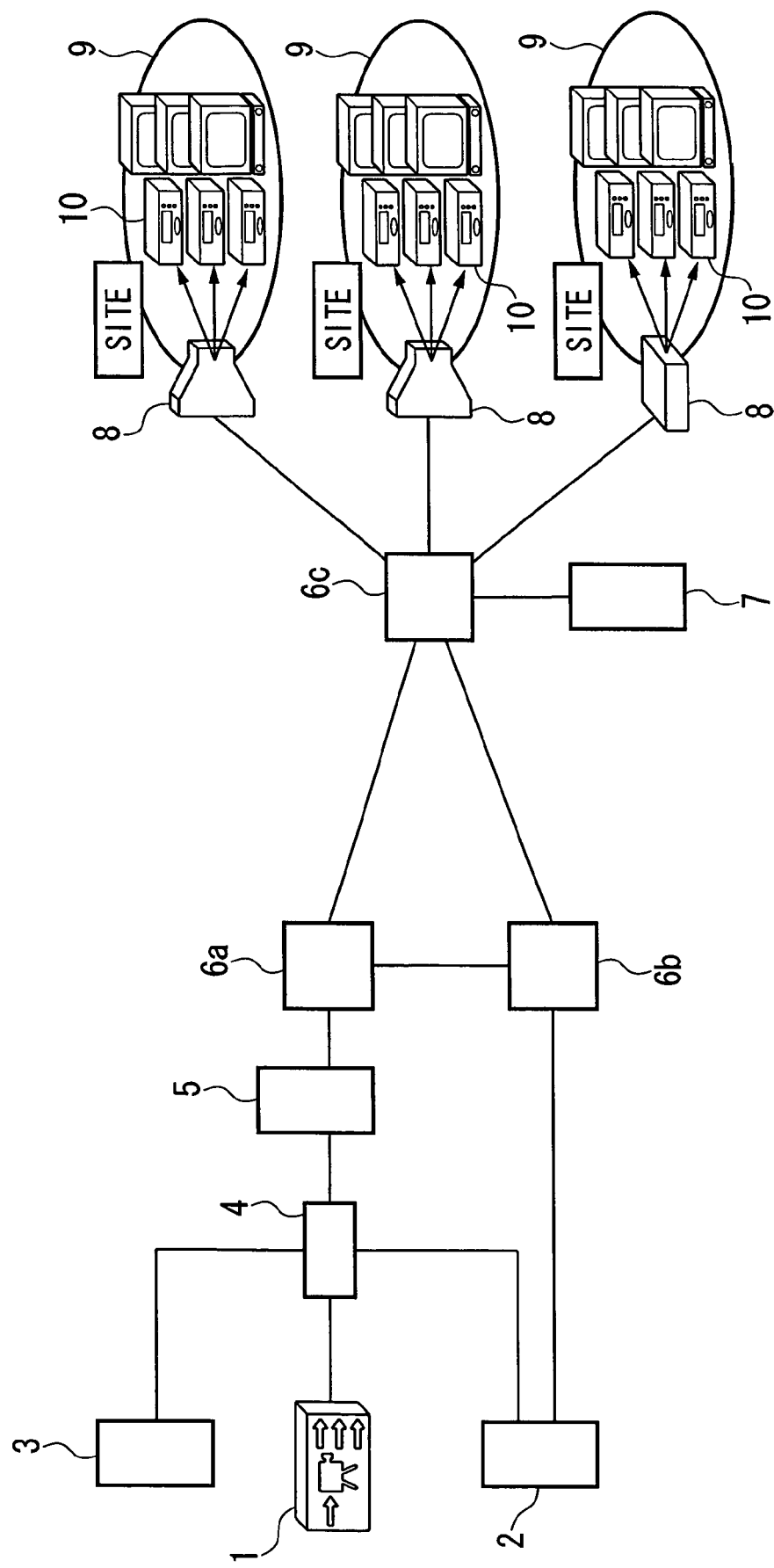
FIG. 1 is a schematic diagram of the configuration of a broadcast-type multicast communication system according to an embodiment of this invention.

FIG. 1 is a schematic diagram of the configuration of a broadcast-type multicast communication system according to an embodiment of this invention. This system implements a broadcast-type multicast communication service.

In FIG. 1, a broadcast distribution server 1, a backup server 2, and a probe transmission server 3 are connected to a Layer-2 (L2) switch 4 incorporating a TAP function (hereinafter abbreviated as "L2 switch"). A delay insertion server 5 is provided between the L2 switch 4 and a Layer-3 (L3) switch 6a, and connects to both the switches 4 and 6a.

The backup server 2, the probe transmission server 3, and the optical path divider 5 are installed near the broadcast distribution server 1. The probe transmission server 3 is provided on the same subnetwork as the broadcast distribution server 1.

L3 switches 6a, 6b, and 6c are mutually connected, and form an IP network which supports multicast communications in broadcast format. A communication control device 7 is connected to the L3 switch 6c at the edge nearest the client side. The communication control device 7 is installed near the L3 switch 6c.

Routers 8 for sites 9 are also connected to the L3 switch 6c. Clients of the broadcast-type multicast communication service subscribe to the sites 9. Each client terminal 10 connects to the router 8 of its own site 9.

The operation of the broadcast-type multicast communication service shown in FIG. 1 will be explained below.

Figure 2:
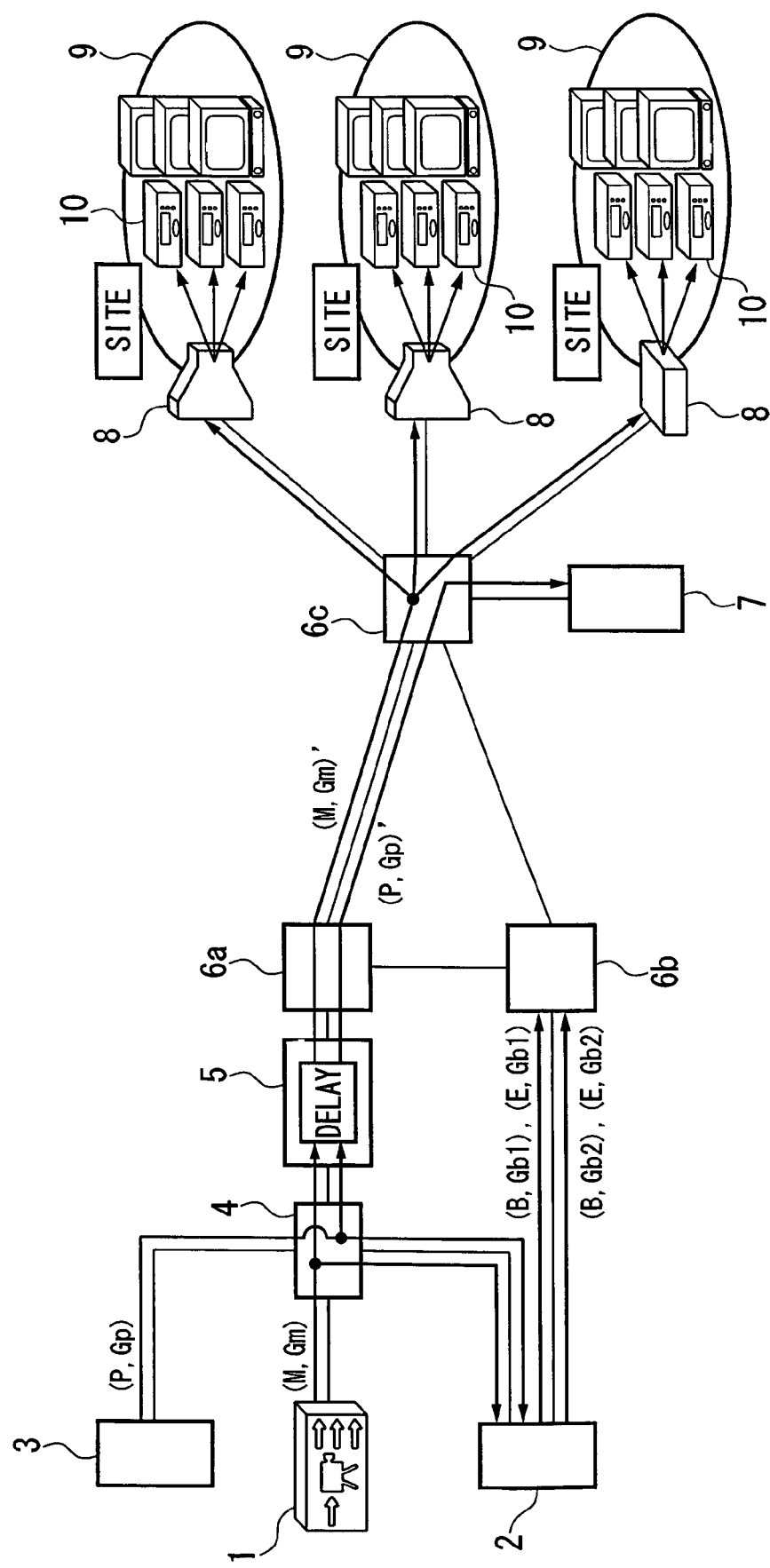
FIG. 2 is an explanatory diagram of a normal state operation of the broadcast-type multicast communication service shown in FIG. 1.

First, a normal state operation of the broadcast-type multicast communication service shown in FIG. 1 will be explained. FIG. 2 is an explanatory diagram of a normal state operation of the broadcast-type multicast communication service shown in FIG. 1.

In FIG. 2, the broadcast distribution server 1 transmits a multicast packet (source M, destination Gm; hereinafter "M, Gm") which stream data for distribution is stored in. The multicast packet (M, Gm) is copied by the L2 switch 4 and transmitted to the backup server 2 and the delay insertion server 5, where it is received accordingly. The backup server 2 copies the multicast packet (M, Gm) received from the L2 switch 4, and generates two multicast packets. One is a multicast packet (B, Gb1) whose source is converted to B and whose destination is converted to Gb1, and the other is a multicast packet (B, Gb2) whose source is converted to B and whose destination is converted to Gb2. The multicast packet (B, Gb1) is transmitted to the L3 switch 6b immediately after generation. The multicast packet (B, Gb2) is transmitted to the L3 switch 6b after a fixed period of time elapses after generation. For example, a delay of 50 ms is inserted. In the normal state, even if the L3 switch 6b receives the multicast packets (B, Gb1) and (B, Gb2), it destroys them without allowing them to pass.

The delay insertion server 5 transmits the multicast packet (M, Gm) which has been received from the L2 switch 4 to the L3 switch 6a after a fixed period of time elapses. The delay time which is inserted to the multicast packet (M, Gm) corresponds to the processing time that may be required by the backup server 2 from the moment when the backup server 2 receives the multicast packet (M, Gm) to the moment when the backup server 2 transmits the multicast packet (B, Gb1). A multicast packet to which the delay has been inserted is termed a multicast packet (M, Gm)'. The inserted delay cancels out the processing delay of the backup server 2, therefore, the multicast packet (M, Gm)' and the multicast packet (B, Gb1) are synchronized precisely.

The multicast packet (M, Gm)' is distributed to each site 9 via the L3 switches 6a and 6c. Each client terminal 10 receives the multicast packet (M, Gm)' via the router 8 of its own site 9, and reproduces the stream data stored in the multicast packet (M, Gm)'.

Subsequently, an operation of the system during normal state will be explained with reference to FIG. 2, concentrating on a multicast packet for probe.

In FIG. 2, the probe transmission server 3 transmits a multicast packet (P, Gp) for probe at regular intervals, e.g. at 10 ms intervals. This transmission interval is set to an appropriate value which exceeds the average value of the interval at which the broadcast distribution server 1 transmits the multicast packet (M, Gm). The L2 switch 4 transmits the multicast packet (P, Gp) to the backup server 2 and the delay insertion server 5, where it is received accordingly.

From the multicast packet (P, Gp) which has been received from the L2 switch 4, the backup server 2 generates two multicast packets (E, Gb1) and (E, Gb2) in the same manner as when receiving the multicast packet (M, Gm) described above, and transmits them to the L3 switch 6b. The transmission source is changed to E.

The multicast packet (E, Gb1) is transmitted to the L3 switch 6b immediately after generation. The multicast packet (E, Gb2) is transmitted to the L3 switch 6b after a fixed period of time elapses after generation, in the same manner as the multicast packet (B, Gb2) mentioned earlier. As in the case of the multicast packets (B, Gb1) and (B, Gb2) above, even if the L3 switch 6b receives the multicast packets (E, Gb1) and (E, Gb2) during the normal state, it destroys them without allowing them to pass.

The delay insertion server 5 transmits the multicast packet (P, Gp) which has been received from the L2 switch 4 to the L3 switch 6a after the same time elapses as it when received the multicast packet (M, Gm). A multicast packet to which this delay has been inserted is termed a multicast packet (P, Gp)'. The inserted delay synchronizes the multicast packet (P, Gp) with the multicast packets (M, Gm)' and (B, Gb1).

The communication control device 7 is participating in the destination Gp. Consequently, the multicast packet (P, Gp)' is distributed via the L3 switches 6a and 6c to the communication control device 7. The communication control device 7 measures the reception interval of the multicast packet (P, Gp)' and determines the successful communication of the multicast packet (M, Gm)' based on the reception interval of the multicast packet (P, Gp)'. Specifically, if the multicast packet (P, Gp)' is not received after a fixed period of time elapses, the communication control device 7 determines that the communication of the multicast packet (M, Gm)' was broken. For this reason, the communication control device 7 starts fault processing that will be explained later. On the other hand, if reception of the multicast packet (P, Gp)' restarts after the detection of the broken communication of the multicast packet (M, Gm)', the communication control device 7 determines that the communication of the multicast packet (M, Gm)' has restarted and, for that reason, starts fault recovery processing that will be explained later.

The multicast packets (M, Gm)' and (P, Gp)' are transmitted/received via the same distribution path according to the following configurations (A-1 and A-2).

(A-1) The destinations Gm and Gp are given a shared rendezvous point (RP). Alternatively, they are arranged in the same group.

(A-2) The source P uses the same subnetwork as the source M. Alternatively, it is given the same address. When the addresses are the same, different UDP port numbers are applied.

The probe transmission server 3 appends a sequence number and/or a timestamp to the multicast packet (P, Gp).

An input port for a path inputting from the L3 switch 6a and an output port for a path outputting to the communication control device 7 are set in the same segment of the L3 switch 6c.

Subsequently, an operation when there is a fault in the broadcast-type multicast communication system shown in FIG. 1 will be explained.

Figure 3:
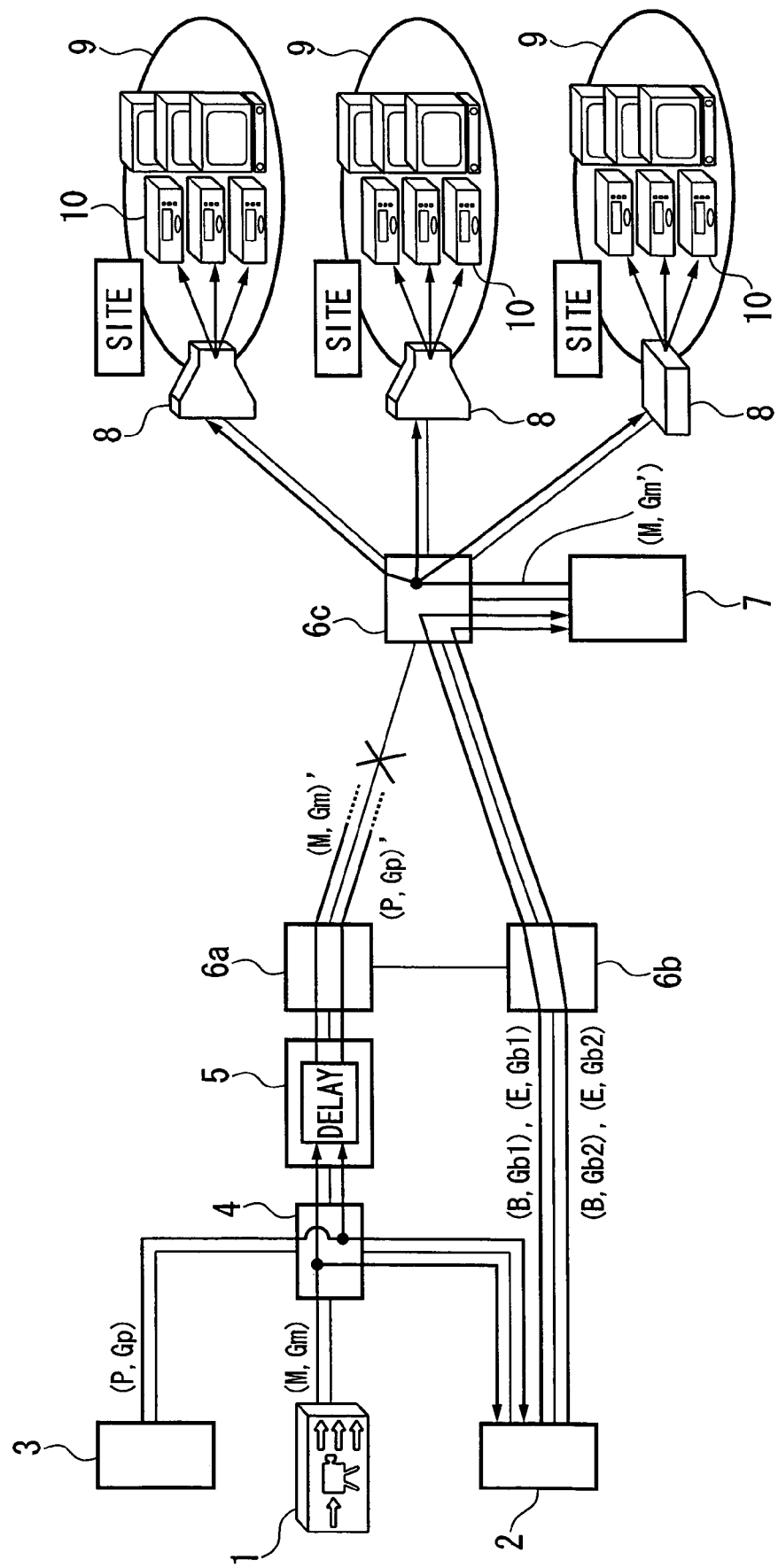
FIG. 3 is an explanatory diagram of an operation when a fault has occurred in the broadcast-type multicast communication system shown in FIG. 1.

FIG. 3 is an explanatory diagram of an operation when there is a fault in the broadcast-type multicast communication system shown in FIG. 1.

In FIG. 3, when the communication control device 7 detects that the communication of the multicast packet (M, Gm)' is broken using the method described above, it makes a request to the L3 switch 6c to participate in the destinations Gb1 and Gb2. In accordance with the request, the L3 switch 6c makes a request to the L3 switch 6c to create a new distribution tree, and a distribution tree extending from the L3 switch 6b to the L3 switch 6c is created. The multicast packets (B, Gb1), (B, Gb2), (E, Gb1), and (E, Gb2) are thus distributed to the communication control device 7 via the L3 switches 6b and 6c.

The communication control device 7 uses the multicast packets (B, Gb1), (B, Gb2), (E, Gb1), and (E, Gb2) for distribution processing when there is a fault. One of the following distribution methods (1) and (2) is used.

(1) Inbound Match Detection Method

Figure 4:
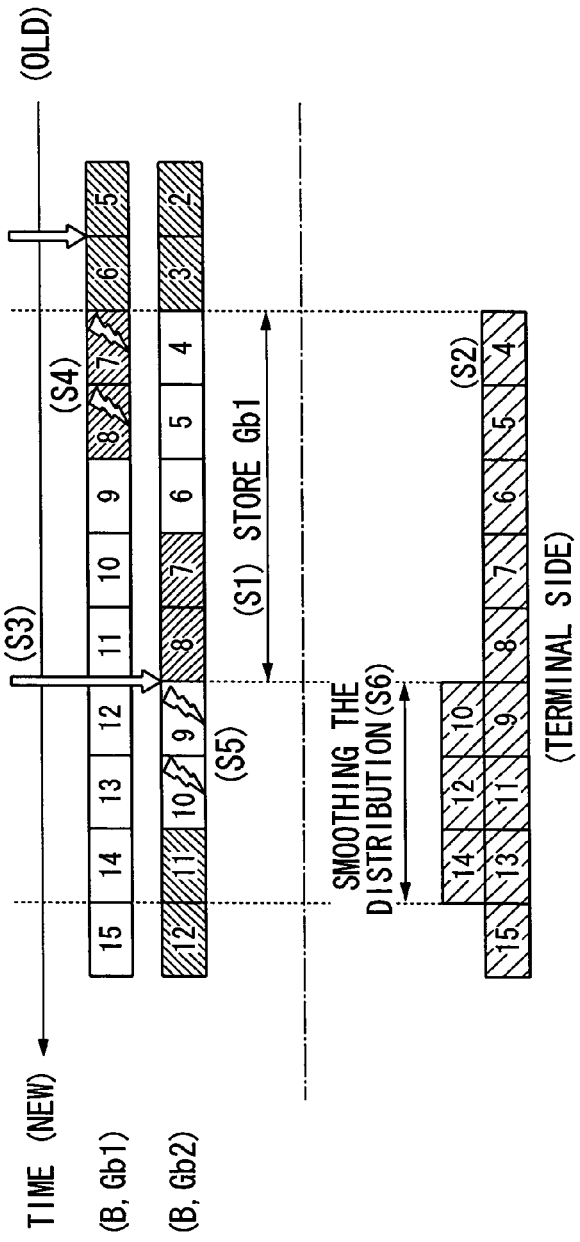
FIG. 4 is a schematic diagram for explanation of a method of distribution processing when a fault has occurred, according to the embodiment of this invention.

FIG. 4 is a schematic diagram for explanation of an inbound match detection method.

In FIG. 4, the communication control device 7 participates in the destinations Gb1 and Gb2 due to the detection of the broken communication of the multicast packet (M, Gm)' (step S0).

The multicast packets (B, Gb1) which has been received from the L3 switch 6c are then stored sequentially in a transmission queue (step S1). In FIG. 4, storing in the transmission queue starts sequentially from the packet (B, Gb1) with the sequence number of "7".

The multicast packet (B, Gb2) which has been received from the L3 switch 6c is converted to the multicast packet (M, Gm') and transmitted to the L3 switch 6c (step S2). In FIG. 4, conversion and transmission to the L3 switch 6c starts from the multicast packet (B, Gb2) with a sequence number of "4". The multicast packet (M, Gm') is distributed via the L3 switch 6c to the sites 9.

Next, the UDP checksum of the multicast packet (B, Gb2) is compared with the UDP checksum of the multicast packet (B, Gb1). This comparison takes into consideration of the fact that the destinations Gb1 and Gb2 (destination IP addresses) are used in calculating the UDP checksums. When the UDP checksums are found to match continuously for a fixed number of packets, the communication control device 7 deems the multicast packet (B, Gb2) to be unnecessary and disconnects to the destination Gb2 (step S3). In FIG. 4, the packets (B, Gb1) and (B, Gb2) at sequence number "7" match, as do those at sequence number "8".

All the multicast packets (B, Gb1) which match the multicast packets (B, Gb2) are dequeued from the transmission queue and destroyed (step S4). In FIG. 4, the packets (B, Gb1) with sequence numbers "7" and "8" are destroyed. All the multicast packets (B, Gb2) which are received after disconnection from the destination Gb2 are also destroyed (step S5). In FIG. 4, the packets (B, Gb2) from sequence number "9" onwards are destroyed.

Each time a multicast packet (B, Gb1) is newly received, the received packet is enqueued to the end of the transmission queue, and in addition, according to the queueing order, N packets (e.g. two packets) at the head of the transmission queue are converted to the multicast packet (M, Gm') and transmitted to the L3 switch 6c (step S6). In FIG. 4, for example, when the packet (B, Gb1) of sequence number "12" is received, the received packet is enqueued to the end of the transmission queue, and in addition, the two packets (B, Gb1) of sequence numbers "9" and "10" are converted to the multicast packet (M, Gm') and transmitted to the L3 switch 6c.

This prevents the packets in the transmission queue from being transmitted in a burst-like manner and stops packets from remaining in the transmission queue. In other words, the multicast packet (B, Gb1) which is received from the L3 switch 6c is transmitted to the L3 switch 6c without remaining in the transmission queue. This state indicates that, at the L3 switch 6c, the timing of receiving the multicast packet (M, Gm') from the communication control device 7 is synchronized with the timing of receiving the multicast packet (M, Gm)' from the L3 switch 6b. In FIG. 4, synchronization starts from the packet (B, Gb1) of sequence number "15".

When reception of the multicast packet (P, Gp)' restarts, the communication control device 7 determines that communication of the multicast packet (M, Gm)' has restarted, and starts fault recovery processing. In this fault recovery processing, the communication control device 7 disengages from the destination Gb1. Since the multicast packet (B, Gb1) is consequently not distributed to the communication control device 7, the multicast packet (M, Gm') is not transmitted from the communication control device 7. At the L3 switch 6c, the multicast packet which is transmitted to each site 9 switches smoothly from multicast packet (M, Gm') to multicast packet (M, Gm)'. As mentioned above, this is due to the fact that, at the L3 switch 6c, the timing of receiving the multicast packet (M, Gm') from the communication control device 7 is synchronized with the timing of receiving the multicast packet (M, Gm)' from the L3 switch 6b. This prevents multicast packets from being lost while the fault is being recovered.

(2) Outbound Match Detection Method

Figure 5:
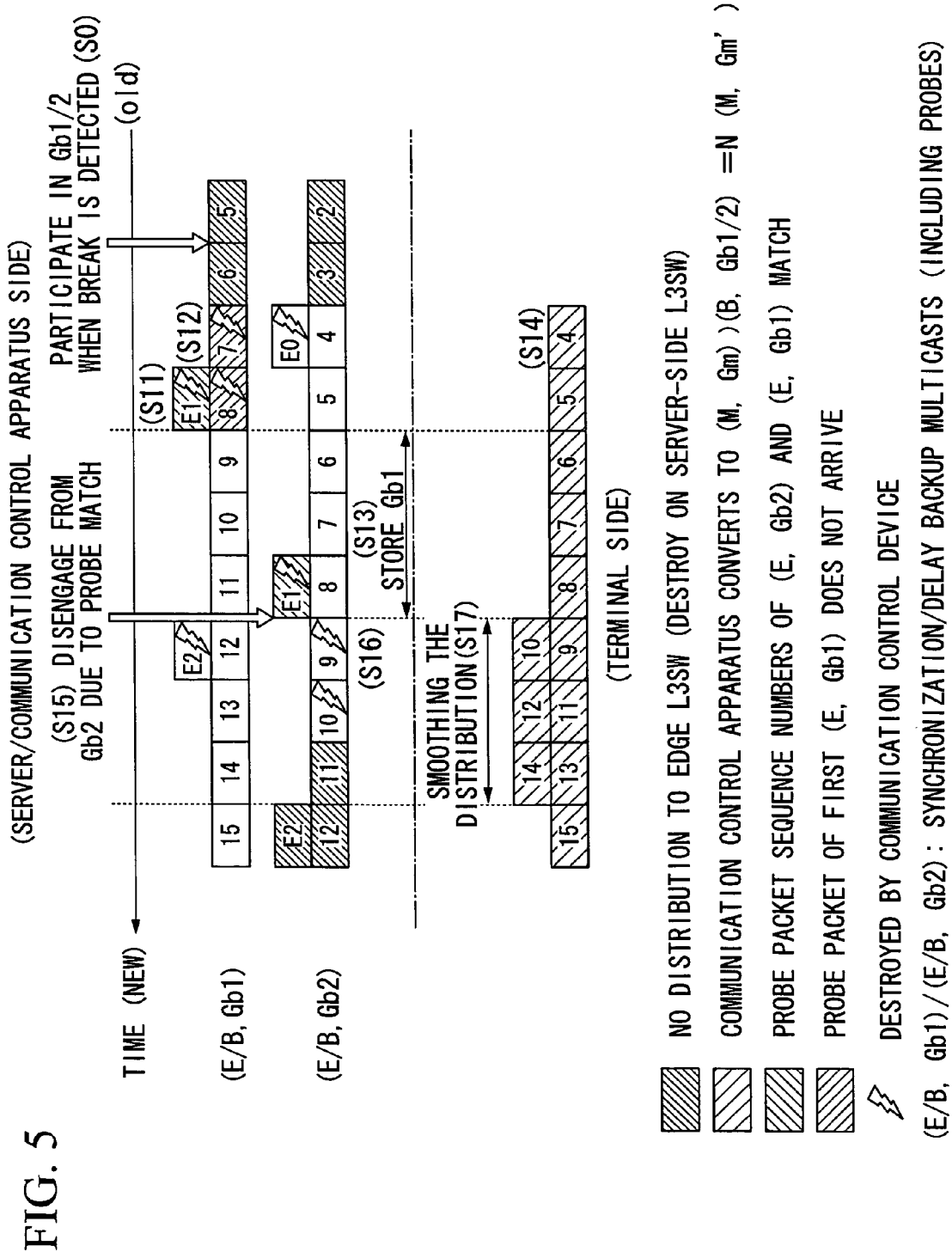
FIG. 5 is a schematic diagram for explanation of another method of distribution processing when there is a disorder according to the embodiment of this invention.

FIG. 5 is a schematic drawing for explanation of an outbound match detection method.

In FIG. 5, the communication control device 7 participates in the destinations Gb1 and Gb2 when the broken communication of the multicast packet (M, Gm)' is detected.

The sequence number (for sake of convenience, "#1") of the probe multicast packet (E, Gb1) which is first received from the L3 switch 6c is recorded (step S11). A timestamp may be stored instead. In the following example, the sequence number is stored. In FIG. 5, the packet (E, Gb1) of sequence number "E1" is received first, and its sequence number "E1" is stored. That is, in FIG. 5, "#1=E1".

The multicast packet (B, Gb1) which was received before the first multicast packet (E, Gb1) is destroyed (step S12). In FIG. 5, the packets (E, Gb1) with sequence numbers "7" and "8" are destroyed.

The probe multicast packet (E, Gb1) which was received first and the multicast packet (B, Gb1) and the probe multicast packet (E, Gb1) which were received thereafter are enqueued sequentially in the transmission queue (step S13). In FIG. 5, the packets (E, Gb1) from sequence number "E1" onwards and the packets (B, Gb1) from sequence number "9" onwards are stored sequentially in the transmission queue.

A list structure ((E, Gb1) list) for linear searching is created only for the probe multicast packets (E, Gb1) according to the sequence they are received in.

The multicast packets (B, Gb2) which are received from the L3 switch 6c are converted to the multicast packet (M, Gm)' and transmitted to the L3 switch 6c (step S14). In FIG. 5, conversion and transmission to the L3 switch 6c starts from the multicast packet (B, Gb2) with a sequence number of "4". The multicast packet (M, Gm)' is distributed via the L3 switch 6c to the sites 9.

Every time the communication control device 7 receives the probe multicast packet (E, Gb2), the communication control device 7 compares the sequence number of the received packet (for sake of convenience, "#2") with the recorded sequence number "#1". When a condition of "#2≧#1" is satisfied, the communication control device 7 disengages from the destination Gb2 (step S15). In FIG. 5, packets (E, Gb1) and (E, Gb2) of sequence number "E1" match each other, and therefore, the above condition is satisfied. All multicast packets (B, Gb2) which are received after disengagement from Gb2 are destroyed (step S16). In FIG. 5, the packets (B, Gb2) of sequence number "9" and onwards are destroyed.

When the condition of "#2≧#1" is first satisfied and is not "#2=#1", the (E, Gb1) list is searched from the head and a multicast packet (E, Gb1) whose maximum sequence number is no greater than "#2" is searched. All multicast packets (B, Gb1) which were stored in the transmission queue prior to the multicast packet (E, Gb1) which is found by this search are removed from the transmission queue.

Each newly received multicast packet (B, Gb1) is enqueued to the end of the transmission queue, and in addition, according to the queueing order, N packets (e.g. two packets) from the head of the transmission queue are converted to the multicast packet (M, Gm)' and transmitted to the L3 switch 6c (step S17). In FIG. 5, for example, when the packet (B, Gb1) of sequence number "12" is received, it is enqueued to the end of the transmission queue, and the two packets (B, Gb1) of sequence numbers "9" and "10" are converted to the multicast packet (M, Gm)' and transmitted to the L3 switch 6c.

As in the inbound match detection method described earlier, the outbound match detection method prevents the packets in the transmission queue from being transmitted in a burst like-manner while eliminating packets which remains in the transmission queue. At the L3 switch 6c, the timing of receiving the multicast packet (M, Gm') from the communication control device 7 is made synchronous with the timing of receiving the multicast packet (M, Gm)' from the L3 switch 6b. In FIG. 5, synchronization starts from the packet (B, Gb1) of sequence number "15". Since the subsequent fault recovery processing is the same as in the inbound match detection method, it will be not explained here.

In this embodiment, when switching from the multicast packet (M, Gm)' to the multicast packet (M, Gm') after a fault is detected, there is a possibility that same packets which are distributed to the sites 9 may arrive sequentially. That is, there is a possibility that packets which are distributed to the sites 9 by the multicast packet (M, Gm)' immediately before switching may be the same as those which are distributed by the multicast packet (M, Gm) immediately after switching. A method for avoiding such packet duplication as many as possible will be explained with reference to FIG. 6.

During normal operation, the communication control device 7 stores the sequence numbers of the multicast packets (P, Gp)' which are received from the L3 switch 6c. Timestamps may be recorded instead. In the following example, the sequence numbers are recorded.

In FIG. 6, the communication control device 7 participates in the destinations Gb1 and Gb2 when communication of the multicast packet (M, Gm)' is broken (step S0).

The sequence number (for sake of convenience, "#3") of the probe multicast packet (P, Gp)' which was last received from the L3 switch 6c is recorded (step S21). In FIG. 6, the last packet received is the multicast packet (P, Gp)' having a sequence number of "P3", and this sequence number "P3" is recorded. That is, in FIG. 6, "#3=P3".

Failure distribution processing then starts, using one of the methods (1) and (2) described above. The multicast packet (B, Gb2) which was received from the L3 switch 6c is not immediately converted to the multicast packet (M, Gm') and transmitted to the L3 switch 6c, but is instead momentarily enqueued according to the reception order to the transmission queue. Processing is then executed in accordance with the conditions (B-1, B-2, and B-3) explained below. The received multicast packet (B, Gb2) may be converted to the multicast packet (M, Gm') and transmitted to the L3 switch 6c until the first probe multicast packet (E, Gb2) is received.

Every time the communication control device 7 receives the probe multicast packet (E, Gb2), it compares the sequence number of the received packet (for sake of convenience, "#4") with the recorded sequence number "#3".

(B-1) When a condition of "#4≦#3" is satisfied, the multicast packet (B, Gb2) in the transmission queue is destroyed (step S22). In FIG. 6, the packets (E, Gb2) of sequence numbers "6", "7", and "8" are destroyed.

(B-2) When, in addition to the condition of B-1, a condition of "#4=#3" is satisfied, the multicast packet (E, Gb2) subsequently received is converted to a multicast packet (M, Gm') and transmitted to the L3 switch 6c (step S23). In FIG. 6, conversion and transmission to the L3 switch 6c starts from the packet (B, Gb2) with a sequence number of "9". The multicast packet (M, Gm') is distributed via the L3 switch 6c to the sites 9.

(B-3) On the other hand, when a condition of "#4>#3" is satisfied, the multicast packet (B, Gb2) in the transmission queue is converted to the multicast packet (M, Gm') and sequentially transmitted to the L3 switch 6c. When transmitting the packet in the transmission queue, transmission may be controlled in accordance with the reception timing of the multicast packet (B, Gb2) as in the methods (1) and (2) above to prevent a transmission in a burst-like manner.

As shown in FIG. 6, although there is a slight possibility of packet duplication when switching from the multicast packet (M, Gm)' to the multicast packet (M, Gm'), the amount of duplication is far less than when these countermeasures are not implemented. Consequently, the usage efficiency of the communications line can be improved.

While in the embodiment described above, the communication control device 7 determines that communication of the multicast packet (M, Gm)' has restarted based on the restart of reception of the multicast packet (P, Gp)', another method may be used. Specifically, the communication control device 7 determine that communication of the multicast packet (M, Gm)' has restarted by participating in the destination Gm at the point when the communication break of the multicast packet (M, Gm)' is detected and detecting the start of its reception. In this case, the communication control device 7 quickly disengages from the destination Gm after reception of the multicast packet (M, Gm)' restarts.

When determining that communication of the multicast packet (M, Gm)' has restarted based on the restart of reception of the multicast packet (P, Gp)' as described in the above embodiment, there are some possibility that the reception restart timing of the multicast packet (P, Gp)' may not exactly match the communication restart timing of the multicast packet (M, Gm)'. Accordingly, the communication control device 7 uses methods (C-1 and C-2) below to adjust the transmission stop timing of the multicast packet (M, Gm)'.

(C-1) When the communication control device 7 detects the restarted reception of the multicast packet (P, Gp)', it starts a timer (e.g. 10 ms) and stops transmission of the multicast packet (M, Gm') after the timer expires.

(C-2) When the communication control device 7 detects the restarted reception of the multicast packet (P, Gp)', it participates in the destination Gm and, when the communication control device 7 detects the restarted reception of the multicast packet (M, Gm)', it stops transmission of the multicast packet (M, Gm)'.

(C-1), (C-2) or an OR condition of the both is applied.

The embodiment described above obtains the following advantageous effects.

By detecting a match between two backup multicast packets (the synchronism backup multicast packet (B, Gb1) and the delay backup multicast packet (B, Gb2)), it is possible to smoothly switch from the delay backup multicast packet (B, Gb2) to the synchronism backup multicast packet (B, Gb1) and prevent transmitting the same packet more than once. This reduces the traffic on the IP network downstream from the L3 switch 6c at the edge parts of the network. Earlier disengagement from the Gb2 also becomes possible. This reduces the traffic on the network upstream from the L3 switch 6c at the edge parts.

By detecting a match between the transmission sequence identification information (sequence numbers or timestamps) appended to two backup probe multicast packets (the synchronism backup probe multicast packet (E, Gb1) and the delay backup probe multicast packet (E, Gb2)), a match can be determined between the synchronism backup multicast packet (B, Gb1) and the delay backup multicast packet (B, Gb2).

By slowly overlapping the transmission timing of the synchronism backup multicast packet (B, Gb1), which is enqueued to the transmission queue until the delay backup multicast packet (B, Gb2) switches to the synchronism backup multicast packet (B, Gb1), with the reception timing of the packet (B, Gb1), burst transmission can be avoided and a momentary traffic increase on the network downstream from the L3 switch 6c at the edge parts can be prevented.

By providing probe multicast packets (P, Gp) and (P, Gp)' which follow the same distribution path as the main multicast packets (M, Gm) and (M, Gm)', communication breaks in the main multicast packets (M, Gm) and (M, Gm)' can be detected precisely and more promptly without being affected by the performance of the broadcast server and the contents of the distribution target.

By providing the probe multicast packets (P, Gp) and (P, Gp)', it is possible to detect any overlap that may be occurred between the main multicast packet (M, Gm)' and the delay multicast packet (B, Gb2) in the step of switching when a fault is detected. Consequently, during the switch from the main multicast packet (M, Gm)' to the backup multicast packet (M, Gm') when a fault is detected, transmission of a duplicated packet can be prevented and the traffic on the network downstream from the L3 switch 6c at the edge parts can be reduced.

Although a delay corresponding to the processing time at the backup server 2 is inserted to the synchronism multicast packet (B, Gb1), therefore, it is not completely synchronous with the main multicast packet (M, Gm), however, the delay insertion server 5 obtains the multicast packet (M, Gm)' by inserting a delay corresponding to the processing time at the backup server 2 to the multicast packet (M, Gm), and it becomes possible to compensate the synchronism between the packets (B, Gb1) and (M, Gm)'. Consequently, packet loss caused by switching back from the packet (B, Gb1) to the packet (M, Gm)' can be prevented.

By providing the probe multicast packets (P, Gp) and (P, Gp)', the communication control device 7 does not need to constantly receive the main multicast packet (M, Gm)', reducing the processing load.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, embodiments such as the following may be implemented.

An embodiment using the configuration of FIG. 1 will be explained.

This embodiment uses a "catalyst switch" manufactured by Cisco Systems Inc. A multipurpose multicast station is operated on a personal computer (PC) as a broadcast distribution server. A PC including multiple network interface cards (NICs) is used as a delay insertion server, a backup server, and a communication control device. A multipurpose network test device is used as a probe transmission server. The specific configuration is shown below.

The backup server exclusively uses one of its NICs to constantly receive a multicast packet (M, Gm) which is transmitted from the broadcast distribution server. Specifically, the NIC is connected to an L2 switch including a TAP function which is shared with the broadcast distribution server.

The probe transmission server constantly transmits a multicast packet for probe (P, Gp) at intervals of 10 ms.

The delay insertion server is provided between the L2 switch (reference numeral 4 in FIG. 1) and the L3 switch (reference numeral 6a in FIG. 1) and functions as a bridge (L2 switch). The delay insertion server uses one of its NICs to receive the multicast packet (M, Gm) which is transmitted from the broadcast distribution server and the multicast packet (P, Gp) which is transmitted from the probe transmission server, and, after inserting a delay using a dummynet function of FreeBSD, transmits the multicast packets (M, Gm)' and (P, Gp)' from another NIC to the L3 switch (reference numeral 6a in FIG. 1).

The backup server converts the multicast packets (M, Gm) and (P, Gp) received from the L2 switch (reference numeral 4 in FIG. 1) to multicast packets (B, Gb2) and (E, Gb2) respectively, and, after inserting a delay using the dummynet function FreeBSD, transmits them to the L3 switch (reference numeral 6b in FIG. 1) by exclusively using one of its NICs.

The backup server also creates multicast packets (M, Gm) and (P, Gp), converts them respectively to multicast packets (B, Gb1) and (E, Gb1), and transmits them to the L3 switch (reference numeral 6b in FIG. 1) by exclusively using one of its NICs.

The multicast packets (B, Gb1), (E, Gb1), (B, Gb2), and (E, Gb2) are not delivered throughout the network (on the client side of the L3 switch 6b of FIG. 1) unless a request to participate in these destinations is received from the communication control device.

The communication control device participates in the destination Gp by connecting to the L3 switch (reference numeral 6c in FIG. 1) at the edge parts near the clients. The communication control device then detects a communication break in the multicast packet (M, Gm)' by monitoring the reception interval of the multicast packet (P, Gp)'. When a communication break is detected, the communication control device simultaneously participates in the destinations Gb1 and Gb2. These participation requests are made to the L3 switch at the edge parts.

While avoiding distribution of duplicated packets by appropriately comparing the multicast packets (P, Gp)', (E, Gb1), and (E, Gb2) which are received from the L3 switch at the edge parts, the communication control device converts the multicast packets (B, Gb1) and (B, Gb2) to a multicast packet (M, Gm') and transmits it to a multicast packet (M, Gm)' reception interface which is provided upstream from the L3 switch at the edge parts. The multicast packet (M, Gm') is thereby distributed to the sites (reference numeral 9 in FIG. 1) along the same path as the multicast packet (M, Gm)'.

In order to make it possible to confirm that the multicast packet (M, Gm') is converted from the multicast packets (B, Gb1) and (B, Gb2), the "IPID field" is adjusted in a manner such as the "IP checksum field" becomes "0x7FFE" or "0xFFFE".

The multicast packet (M, Gm') can be transmitted from the communication control device to the L3 switch at the edge parts by using, for example, the source MAC address of the NIC, since the L3 switch used in this embodiment processes multicast packets having different source MAC addresses in the same manner.

The communication restart of the multicast packet (M, Gm)' is detected by detecting the reception restart of the multicast packet (P, Gp)' from the L3 switch at the edge parts.

What is claimed is:

1. A communication system which uses an IP network to support broadcast-type multicast packet communications, comprising:
   a distribution server which transmits a main multicast packet distributed in a broadcast format;
   a probe transmission server which transmits at fixed intervals of time a probe multicast packet distributed via the same path as the main multicast packet;
   a delay insertion server which receives the main multicast packet and the probe multicast packet, inserts same fixed delay time to both of the received multicast packets, and transmits both of the received multicast packets to the IP network;
   a backup server which receives the main multicast packet, generates two copied multicast packets by copying the received main multicast packet, and transmits one of the copied multicast packets as a synchronism backup multicast packet to the IP network, and in addition, inserts a fixed delay time to rest of the copied multicast packets and transmits as a delay backup multicast packet to the IP network; and
   a communication control apparatus which, when a communication break in the main multicast packet is detected, receives both the backup multicast packets from the IP network, uses the received backup multicast packets to generate a backup main multicast packet which is distributed via the same path as the main multicast packet, and transmits the backup main multicast packet to the IP network;
   the communication control apparatus receiving the probe multicast packet from the IP network and checking a communication condition of the main multicast packet based on a reception interval of the probe multicast packet.

2. A communication system according to claim 1, wherein the delay time inserted by the delay insertion server corresponds to processing time which is required by the backup server from receiving the main multicast packet to transmitting the synchronism backup multicast packet.

3. A communication system according to claim 1, wherein the communication control apparatus comprises:
   a transmission queue which stores the synchronism backup multicast packet which is received;
   a match detection unit which detects reception of the delay backup multicast packet which matches the received synchronism backup multicast packet; and
   a transmission control unit which, when a communication break in the multicast packet is detected, transmits the received delay backup multicast packet as the backup main multicast packet, and, when a match is subsequently detected, extracts the synchronism backup multicast packet from the transmission queue and transmits as the backup main multicast packet, and stops reception of the delay backup multicast packet.

4. A communication system according to claim 3, wherein the match detection unit compares UDP checksums respectively contained in the received synchronism backup multicast packet and the delay backup multicast packet.

5. A communication system according to claim 3, wherein the probe transmission server appends transmission sequence identification information which enables a transmission sequence to be identified to the probe multicast packet;
   the backup server receives the probe multicast packet, generates two copied probe multicast packets by copying the received probe multicast packet, and transmits one of the copied probe multicast packet as a synchronism backup probe multicast packet to the IP network, and in addition, inserts a fixed delay time to rest of the copied probe multicast packet and transmits as a delay backup probe multicast packet to the IP network; and
   the communication control apparatus determines whether or not the synchronism backup multicast packet matches the delay backup multicast packet based on the transmission sequence identification information contained in both the received backup probe multicast packets.

6. A communication system according to claim 3, wherein every time the synchronism backup multicast packet is received from the IP network, the transmission control unit extracts a fixed plurality of synchronism backup multicast packets from the transmission queue and transmits as the backup main multicast packet.

7. A communication system according to claim 3, wherein
the probe transmission server appends transmission sequence identification information which enables a transmission sequence to be identified to the probe multicast packet;
the backup server receives the probe multicast packet, copies the received probe multicast packet, inserts the same delay time as that of the delay backup multicast packet to the copied probe multicast packet and transmits as a delay backup probe multicast packet to the IP network;
the communication control apparatus receives the delay backup probe multicast packet from the IP network; and
the transmission control unit determines, based on the transmission sequence identification information which is respectively appended to the received probe multicast packet and the delay backup probe multicast packet, distribution status at the time of a communication break in the main multicast packet, and, after detection of the communication break in the main multicast packet, controls transmission of the backup main multicast packet by using the delay backup multicast packet.

* * * * *